United States Patent [19]

Fouts

[11] 3,730,305
[45] May 1, 1973

[54] SHOCK ABSORBER PISTON

[75] Inventor: Norman G. Fouts, Belleville, Mich.

[73] Assignee: Ford Motor Company, Dearborn, Mich.

[22] Filed: Apr. 16, 1971

[21] Appl. No.: 134,570

[52] U.S. Cl. .................................. 188/322, 92/248
[51] Int. Cl. ............................................... F16f 9/32
[58] Field of Search ............................ 188/322, 276; 92/248, 249

[56] References Cited

UNITED STATES PATENTS

| 3,212,411 | 10/1965 | Storms | 92/248 |
| 1,802,281 | 4/1931 | Shimer | 92/249 X |
| 3,136,228 | 6/1964 | Dailey | 92/249 X |
| 3,334,549 | 8/1967 | Sheldon | 92/248 |

Primary Examiner—George E. A. Halvosa
Attorney—John R. Faulkner and Clifford L. Sadler

[57] ABSTRACT

A telescopic hydraulic shock absorber for a motor vehicle has a piston of composite construction. The composite piston includes a metal core that is ported to provide jounce and rebound flow passages and a plastic peripheral surface that is in slidable engagement with the pressure tube of the shock absorber.

6 Claims, 2 Drawing Figures

Patented May 1, 1973
3,730,305
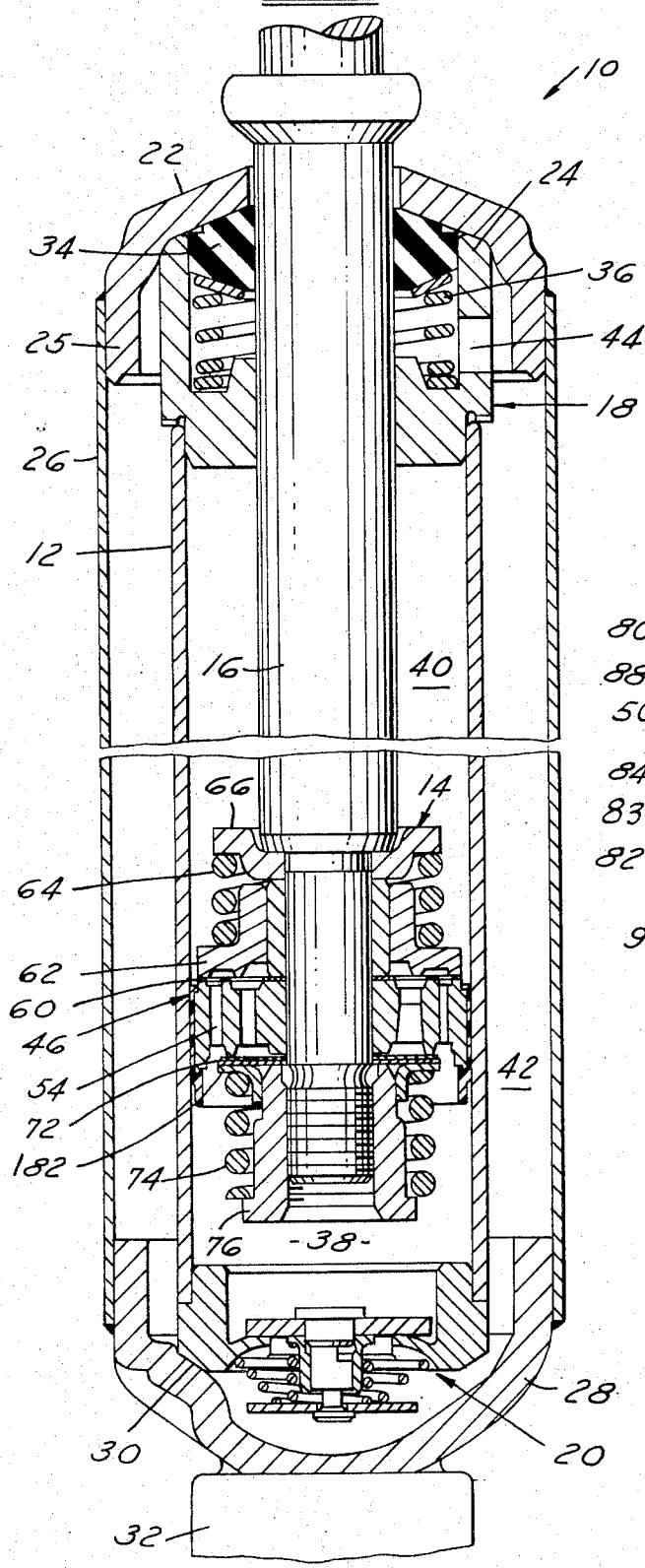
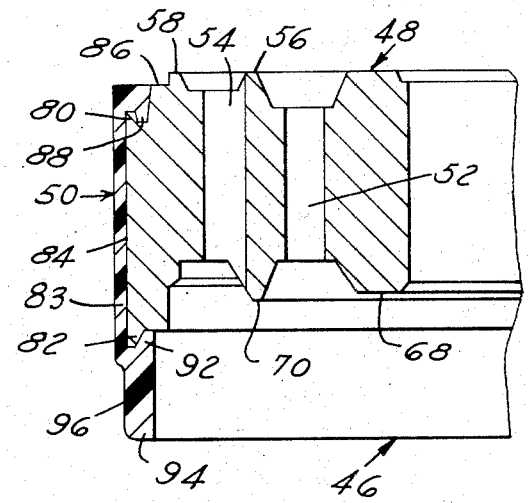
INVENTOR
NORMAN G. FOUTS
BY John R. Faulkner
Clifford L. Sadler
ATTORNEYS

SHOCK ABSORBER PISTON

BACKGROUND OF THE DISCLOSURE

The present invention relates to telescopic hydraulic shock absorbers for motor vehicles, and more particularly to the construction of an improved piston for such devices.

It is presently conventional practice in automotive shock absorbers to provide a cylindrical pressure tube in which a valved piston and rod assembly reciprocates. The valved piston divides the interior of the pressure tube into jounce and rebound pressure chambers. Such a shock absorber is interposed between the sprung and unsprung components of a motor vehicle and relative movement between these components is damped by the restricted flow of hydraulic fluid through the control orifices in the shock absorber piston.

In order to obtain the desired degree of control over hydraulic fluid flow between the two pressure chambers, it is desirable to eliminate any clearance between the piston periphery and the interior wall of the pressure tube. Zero clearance between the piston and pressure tube prevents hydraulic fluid flowing from one pressure chamber to the other from bypassing the control valves in the piston by flowing around the piston.

Zero clearance, however, is not practical in the conventional shock absorber having a metal piston because metal-to-metal engagement of the piston with the pressure tube wall will result in rapid wear of the rubbing components. For that reason, some clearance must be provided between the piston and the pressure tube to assure the presence of a lubricating film of hydraulic fluid and thereby reduce wear. The clearance thus provided, however, constitutes a bypass passage in a conventional shock absorber with a resulting reduction in the control provided by the piston's control valves and ports.

BRIEF SUMMARY OF THE DISCLOSURE

In view of the state of the art, it is the principal object of the present invention to provide a shock absorber for a motor vehicle having a piston with a plastic peripheral surface in slidable engagement with the pressure tube.

In the presently preferred embodiment of this invention, a double acting hydraulic shock absorber is constructed for use in a motor vehicle and has a piston assembly that reciprocates within a pressure tube. The piston assembly includes a piston element of composite construction. The piston element has a metal core molded of sintered powder metal with jounce and rebound flow control passages.

The metallic piston core is placed in an injection molding machine and a plastic bearing surface layer is molded about the periphery of the piston core. The piston core is provided with axially extending upper and lower flanges and the molded plastic bearing surface engages the flanges in an interlocking relationship. The plastic layer is molded to an outside diameter very nearly equal to the inside diameter of the pressure cylinder whereby a minimum clearance is provided. In order to permit the insertion of the piston assembly into the pressure tube during mass production operations, the plastic bearing surface is provided with a cylindrical extension or skirt of reduced diameter that extends below the metallic piston core. This extension or skirt functions as a guide and permits the ready assembly of the piston into the pressure tube.

BRIEF DESCRIPTION OF THE DRAWINGS

The many objects and advantages of the present invention will become apparent upon consideration of the following detailed discussion and the accompanying drawings, in which:

FIG. 1 is an elevational view, in section, of a double acting shock absorber for a motor vehicle having a piston constructed in accordance with this invention; and FIG. 2 is an enlarged sectional view of the composite piston shown in FIG. 1.

DETAILED DESCRIPTION OF THE PRESENTLY PREFERRED EMBODIMENT

Referring now to the drawings, wherein the presently preferred embodiment of this invention is illustrated, FIG. 1 discloses a direct acting hydraulic shock absorber 10 for a motor vehicle. The shock absorber 10 includes a pressure tube 12 in which a piston assembly 14 is reciprocably mounted. A piston rod 16 has one end connected to the piston assembly 14 and its other end extending upwardly. Means are provided on the upper end of the piston rod 16 for connecting it to a sprung component of a motor vehicle.

The upper end of the pressure tube 12 is closed by a rod guide 18 and the lower end of the pressure tube 12 is closed by a foot valve assembly 20. An annular cap member 22 is seated on an annular flange portion 24 of the rod guide 18 and has a depending flange 25 to which a reservoir tube 26 is connected. A lower cap 28 is welded to the reservoir tube 26 and engages the foot valve assembly 20 at spaced points such as at 30. Attachment means 32 is secured to the lower cap 28 and provides a device for connecting the shock absorber 10 to an unsprung component of a motor vehicle suspension system.

The piston rod 16 extends through the rod guide 18 and the cap 22. Positioned between the cap 22 and guide 18 is a rubber seal 34 that is in slidable sealed engagement with the piston rod 16. A coil spring 36 is interposed between the rod guide 24 and the seal 34 to urge the seal into tight engagement with the piston rod 16.

The piston assembly 14 divides the interior of the pressure tube 12 into jounce and rebound pressure chambers 38 and 40. The jounce chamber 38 is situated between the piston assembly 14 and the foot valve 20. The rebound chamber 40 is of annular shape and is situated between the piston assembly 14 and the rod guide 18. An annular reservoir chamber 44 is defined between the pressure tube 12 and the reservoir tube 26. The chamber in which the seal spring 36 is situated is in communication with the reservoir chamber 42 by means of a port 44 in the flange 24 of the rod guide 18. Port 44 permits fluid leaking between the rod 16 and guide 18 to be returned to the reservoir chamber 42.

The piston 46 is of composite construction and comprises a metal core 48 and a plastic peripheral portion 50. The construction of the plastic portion 50 will be described in greater detail later.

The piston 46 is provided with a series of rebound ports 52 and a series of jounce ports 54. Annular valve seats 56 and 58 are provided on the upper surface of the piston core 48 and are situated inwardly and outwardly, respectively, of the jounce ports 54. A disc shaped valve element 60 is pressed into sealing engagement with the valve seats 56 and 58. Spring seat 62 engages the valve element 60. A coil spring 64, interposed between the spring seat 62 and a second spring seat 66, urges the valve element 60 to a closed position.

The piston 46 is provided with depending annular valve seats 68 and 70 on its lower surface that are spaced inwardly and outwardly of the rebound passages 52. A disc shaped valve element 72 is seated against the valve seats 68 and 70 and is held in that position by a coil spring 74 that is interposed between a flanged nut 76 and a spring seat 182 which engages the disc 72.

The nut 76 is threaded on the reduced diameter end portion of the piston rod 16 and serves to hold the several components of the piston assembly 14 in their appropriate relative position.

In order to provide a minimum clearance between the piston 46 and the interior of the pressure tube 12, the plastic portion 50 is provided on the exterior periphery of the metal core 48. The plastic layer 50 may be formed of nylon or other plastic material having similar properties. The core 48 of the piston 46 is provided with an upwardly extending annular flange 80 and a downwardly extending annular flange 82. The plastic portion 50 is molded with a thin layer 83 of uniform thickness completely enveloping the cylindrical periphery 84 of the core 48 situated between the annular flanges 80 and 82. In one embodiment of the invention, the plastic layer 83 covering the periphery of the metallic core 46 was 0.015 inches in thickness.

The upper surface of the core 48 is provided with a flat annular surface 86 that extends in a plane perpendicular to the axis of the piston 46 and the plastic portion 50 is molded even with the surface 86. It is to be noted from FIG. 2 that the limit of the flange 80 is spaced from the surface 86 so that the plastic portion 50 may flow and be molded into a downwardly extending annular flange 88. This construction provides an interlocking relationship which secures the upper end of the plastic portion 50 in position.

The plastic portion 50 is also molded in interlocking relationship about the depending flange 82 of the core 48 so as to provide an upstanding circumferential portion 92 that is spaced upwardly and inwardly of the metal flange 82.

The plastic piston portion 50 includes a depending plastic flange or skirt 94. The flange 94 extends for a length of between one quarter and one fifth of the total axial length of the plastic portion 50. The flange 94 has a reduced diameter peripheral surface 96 and is of sufficient thickness to be rigid.

The composite piston 46 is molded with the plastic portion 50 having an outside diameter that is very slightly less than the inside diameter of the tube 12 in order to compensate for manufacturing tolerances in the dimensions of these parts.

OPERATION

The plastic portion 50 provides a nonmetallic bearing surface in slidable engagement with the wall of the pressure tube 12. Because of the low friction bearing qualities of the plastic, there is a reduced need for lubrication and clearance between the piston and the pressure tube.

The portion 83 of plastic 50 is manufactured with an outside diameter that nearly equals the inside diameter of the pressure tube 12. Therefore, insertion of the piston assembly 46 into the pressure tube 12 would be extremely difficult without the presence of the reduced diameter flange portion 94 which facilitates the assembly of the components.

In one embodiment of the present invention, the pressure tube 12 has a nominal diameter of 1.0000 inch with a tolerance of plus or minus 0.0005 so that under some manufacturing conditions the pressure tube may have an inside diameter of 0.9995 inches. The piston assembly 46 is manufactured with an outside diameter in the range of 0.9982 to 0.9975 inches. In this one embodiment of the invention, the plastic portion 50 is manufactured of nylon which has a propensity to absorb moisture that will cause it to swell. The absorption of moisture can cause the diameter of the composite piston 46 to increase by 0.0010 inches so that, under some manufacturing conditions, the piston assembly 46 may have a maximum diameter of 0.9992 inches. The insertion of a piston having an outside diameter of 0.9992 into a pressure tube having an inside diameter of 0.9995 inches provides a clearance of only 0.0003 inches. The assembly of these parts would be nearly impossible if it were not for the reduced diameter flange portion 94 which serves to guide the composite piston 46 into the pressure tube.

The plastic portion 50 provides a superior bearing surface so that minimal clearance may be provided between the piston 46 and tube 12. With minimal clearance, practically no fluid bypasses the ports 52 and 54 during a stroke of the shock absorber and the valving within the piston assembly 14 provides substantially all of the control over the flow of fluid between the jounce pressure chamber 34 and rebound chamber 40.

The valving of the piston 14 operates in a reasonably conventional fashion. During a compression stroke when the piston assembly 14 is travelling downwardly in the pressure tube 12, the jounce chamber 38 will be reduced in size. Fluid will flow from the jounce chamber 38 through the jounce flow passages 54 against the resistance provided by the spring pressed valve element 60. Fluid will also flow from the jounce chamber 34 through the valving of the foot valve 20 to the reservoir chamber 42 in an amount equal to the fluid displaced by the piston rod 16. The foot valve 20 is similar in construction and operation to the foot valve described in U.S. Pat. No. 2,691,387 to J. N. Strauss.

During a rebound stroke when the piston assembly 14 is moving upwardly in the pressure tube 12, fluid will be forced from the rebound chamber 40 through the rebound passages 52. This fluid flow will be controlled by the spring pressed valve element 72. At the same time, fluid will be drawn through the replenishing valve passages of the foot valve assembly 20 into the jounce chamber 38 from the reservoir chamber 42 in an amount equal to that which was displaced by the piston rod 16 as it is withdrawn from the pressure tube 12.

Tremendous pressures are created in the shock absorber 10 when it is operating in a vehicle travelling a rough road. These pressures tend to dislodge the plastic portion 50 and extrude it through the gap between the pressure tube and the piston core 48. The unique interlocking relationship between plastic portion 50 and the core flanges 80 and 82 prevents such displacement from occurring.

The foregoing description presents the presently preferred embodiment of this invention. Modifications and alterations may occur to those skilled in the art that will come within the scope and spirit of the following claims.

I claim:

1. A shock absorber for a motor vehicle having a piston reciprocable within a pressure tube, said piston being of composite construction and having a metallic core with jounce and rebound flow passages, a plastic exterior layer surrounding the peripheral surface of said metallic core, said plastic layer having a cylindrical surface in slidable engagement with said pressure tube, said surface having an exterior diameter substantially equal to the interior diameter of said pressure tube whereby only minimal clearance is provided between said piston and said tube, said plastic layer having a depending annular flange of substantial length relative to the total length of said plastic layer, said flange being of annular cylindrical shape and having an outside diameter substantially less than the inside diameter of said pressure tube whereby assembly of said piston into said pressure tube is facilitated.

2. A shock absorber for a motor vehicle having a piston reciprocable within a pressure tube, said piston being of composite construction and having a metallic core with jounce and rebound flow passages, a plastic exterior layer surrounding the peripheral surface of said metallic core, said plastic layer having a cylindrical surface in slidable engagement with said pressure tube, said surface having an exterior diameter substantially equal to the interior diameter of said pressure tube whereby only minimal clearance is provided between said piston and said tube, said plastic layer having a depending annular flange of substantial length relative to the total length of said plastic layer, said flange being of annular cylindrical shape and having an outside diameter substantially less than the inside diameter of said pressure tube whereby assembly of said piston into said pressure tube is facilitated, said metallic core having a peripheral upstanding flange on one of its ends and a depending peripheral flange on the other of its ends, said plastic layer having a first portion in interlocking relationship with said upstanding flange, said plastic layer having a second portion in interlocking relationship with said depending flange.

3. A shock absorber for a motor vehicle having a piston reciprocable within a pressure tube, said piston being of composite construction and having a metallic core with jounce and rebound flow passages, a plastic exterior layer surrounding the peripheral surface of said metallic core, said metallic core having a peripheral upstanding flange on one of its ends and a depending peripheral flange on the other of its ends, said one end of said core having an annular groove defined in part by said upstanding flange, said plastic layer having a first portion in interlocking relationship with said upstanding flange and said annular groove, said plastic layer having a second portion in interlocking relationship with said depending flange, said plastic layer having a cylindrical portion of substantially uniform thickness situated between said first and second portions, said cylindrical portion having a surface in slidable engagement with said pressure tube, said surface having an exterior diameter substantially equal to the inside diameter of said pressure tube whereby only minimal clearance is provided between said piston and said tube, said plastic layer having an annular flange depending from said second portion, said plastic annular flange being of substantial length relative to the total length of said plastic layer, said flange being of annular cylindrical shape and having an outside diameter substantially less than the inside diameter of said pressure tube whereby assembly of said piston into said pressure tube is facilitated.

4. A shock absorber for a motor vehicle having a piston reciprocable within a pressure tube, said piston being of composite construction and having a metallic core with jounce and rebound flow passages, a plastic exterior layer surrounding the peripheral surface of said metallic core, said plastic layer having a cylindrical surface in slidable engagement with said pressure tube, said surface having an exterior diameter substantially equal to the interior diameter of said pressure tube whereby only minimal clearance is provided between said piston and said tube, said plastic layer having an integral depending guide means portion of substantial length relative to the total length of said plastic layer, said guide means portion being normally spaced radially inwardly of the inner surface of said pressure tube whereby during the making of said shock absorber said piston may be readily inserted into said pressure tube.

5. A shock absorber for a motor vehicle having a piston reciprocable within a pressure tube, said piston being of composite construction and having a metallic core with jounce and rebound flow passages, a plastic exterior layer surrounding the peripheral surface of said metallic core, said plastic layer having a first portion and a second portion in interlocking relationship with the upper and lower peripheral edges of said core, said plastic layer having a cylindrical bearing surface in slidable engagement with said pressure tube, said surface having an exterior diameter substantially equal to the inside diameter of said pressure tube whereby only minimal clearance is provided between said piston and said tube, said metallic core having a peripheral axially upstanding flange on one of its ends and an axially depending peripheral flange on the other of its ends, said plastic layer first portion being in interlocking relationship with said upstanding flange, said plastic layer second portion being in interlocking relationship with said depending flange.

6. A shock absorber for a motor vehicle according to claim 5 and including:

said one end of said core having an annular groove defined in part by said upstanding flange, said plastic layer first portion being in interlocking relationship with said annular groove.

* * * * *